US012762543B2

United States Patent
(12) United States Patent
Hernandez Acosta et al.

(10) Patent No.: US 12,762,543 B2
(45) Date of Patent: Oct. 13, 2026

(54) ARRANGEMENT OF BLOCKCHAINS WITH A RESTRICTED TRANSACTION

(71) Applicant: ALLFUNDS BANK, S.A.U, Madrid (ES)

(72) Inventors: Alberto Miguel Hernandez Acosta, Madrid (ES); Rubén Nieto Martín-Varés, Madrid (ES)

(73) Assignee: Allfunds Blockchain S.L.U., Madrid (ES)

( * ) Notice: Subject to any disclaimer, the term of this patent is extended or adjusted under 35 U.S.C. 154(b) by 312 days.

(21) Appl. No.: 17/253,237

(22) PCT Filed: Jul. 18, 2019

(86) PCT No.: PCT/ES2019/070503

§ 371 (c)(1),
(2) Date: Dec. 17, 2020

(87) PCT Pub. No.: WO2021/009390

PCT Pub. Date: Jan. 21, 2021

(65) Prior Publication Data

US 2021/0166222 A1 Jun. 3, 2021

(51) Int. Cl.
*G06Q 20/36* (2012.01)
*G06Q 20/06* (2012.01)
(Continued)

(52) U.S. Cl.
CPC ..... *G06Q 20/3678* (2013.01); *G06Q 20/0658* (2013.01); *G06Q 20/383* (2013.01);
(Continued)

(58) Field of Classification Search
CPC .................... G06Q 20/00–425; H04L 9/00–50
See application file for complete search history.

(56) References Cited

U.S. PATENT DOCUMENTS

2018/0019867 A1* 1/2018 Davis .................... H04L 9/0637
2018/0183768 A1* 6/2018 Lobban ................ H04L 63/061

FOREIGN PATENT DOCUMENTS

CN 109409888 A 3/2019
CN 109472601 A 3/2019
(Continued)

OTHER PUBLICATIONS

Andreas M. Antonopoulos, "Mastering Bitcoin", Dec. 1, 2014, O'Reilly Media, Inc. (Year: 2014).*
(Continued)

*Primary Examiner* — Ari Shahabi
(74) *Attorney, Agent, or Firm* — LADAS & PARRY LLP

(57) ABSTRACT

A blockchain arrangement configured to simultaneously distribute at least one public transaction and/or a restricted transaction, wherein the disposition includes a plurality of participating nodes and a plurality of validator nodes connected by a telecommunications network; wherein a proponent participant node is configured to send to all the validator nodes the contents of a tx information transaction record, together with the identifier of a particular preconfigured privacy group; to provide the capabilities of anonymity and privacy to the blockchain system that distributes blocks of information transaction records; such that at least one recipient participating node, connected to a blockchain network, is able to decrypt, read, and execute the information transaction record blocks encrypted by the validator or mining nodes of the blockchain network.

4 Claims, 5 Drawing Sheets

(51) Int. Cl.

| | |
|---|---|
| ***G06Q 20/38*** | (2012.01) |
| ***H04L 9/06*** | (2006.01) |
| ***H04L 9/32*** | (2006.01) |
| *H04L 9/00* | (2022.01) |

(52) U.S. Cl.

CPC .......... *H04L 9/0643* (2013.01); *H04L 9/3255* (2013.01); *H04L 9/50* (2022.05)

(56) References Cited

FOREIGN PATENT DOCUMENTS

| | | | |
|---|---|---|---|
| CN | 110020549 | A | 7/2019 |
| WO | 2019/072299 | A2 | 9/2018 |
| WO | 2018175504 | A1 | 4/2019 |

OTHER PUBLICATIONS

ISR_for_International_Application_PCTES2019070503.
Written_Opinion_for_International_Application_PCTES2019070503.
CN 109409888 A_English Traslation.
CN 110020549 A_English Traslation.
109472601 A_English Traslation.

* cited by examiner

ARRANGEMENT OF BLOCKCHAINS WITH A RESTRICTED TRANSACTION

RELATED APPLICATION

This application is an application under 35 U.S.C. 371 of International Application No. PCT/ES2019/070503 filed on 18 Jul. 2019, the disclosures of which are incorporated in their entirety by reference herein.

OBJECT

This invention refers to the transfer or transaction of information and, more specifically, to a provider of a blockchain solution; namely a network of distributed nodes that validates and distributes blocks of information transaction records that may be encrypted, so that at least one recipient member connected to the blockchain network, is able to decrypt, read, and execute the blocks of transaction records encrypted by the validator or mining nodes in the blockchain network.

STATE OF THE ART

Within any industry, there are numerous private networks built around specific services an for service assets. A private network built around a financial asset may include a plurality of network members such as a service provider; for example, banks, clearing agencies or the like; regulatory institutions, clients, etc., that request the transfer of a financial asset.

One of the main concerns of private networks, and of any network in general, is to ensure that the content of the transactions executed by their systems are disclosed only to the transaction participants.

For example, a service provider processing a transfer of information from a first customer's financial asset would not disclose the content of that transfer of information to unauthorised customers who are not involved in the transfer.

Although the service provider develops its own system for other actors to interact with its system, the rest of the network members also develop their own systems to enable integration with the service provider. This scenario inherently entails the coexistence of many systems created with different technologies and interconnected with different protocols. This diversity of systems leads to several problems that are difficult to resolve:

First, each individual system is inherently different from another individual system, both by the technology used for its development as well as the adaptations of each participant. In addition to requiring a significant and individualised investment by each of the participants to integrate and transmit information between the systems in an appropriate manner.

Second, each individual system may differ in the level of implemented security. For example, each network can provide different protocols for encryption, authentication, data masking, and the like. Therefore, some systems may be more susceptible to compromise, affecting both the compromised system and the data that other systems have shared with it.

Third, the different nature of each system means that data is stored in a non-standardised manner. This means that repeated data reconciliations must occur to verify that the subsets of data shared between the different systems are equivalent.

Finally, fourthly, in the event of a possible loss of information from one of the participants, the recovery of the information will be very costly and will require considerable time during which the affected system will not be available.

SUMMARY

The present invention seeks to solve one or more of the above disadvantages by means of a blockchain arrangement with at least one restricted transaction as defined in the claims.

The proposed blockchain system provides the capability for anonymity and privacy that are not currently available in other blockchain systems. These two new capabilities are developed as a differentiating element in a single chain, which is shared by all the integrating nodes of a blockchain network.

The blockchain network comprises a plurality of participating nodes and validator or mining nodes with a consensus mechanism of evidence of authority.

The method provides, to the plurality of validator nodes, the ability to transform a proposed information transaction record block for a restricted transaction from a proposing participant node into a restricted, anonymous information transaction record block that is transmitted to the plurality of destination participating nodes or blockchain nodes of the blockchain network.

The receiving validator nodes are configured to transmit blocks with encrypted information transaction records to the destination participating nodes in the blockchain network.

The transaction validated by the receiving validator node, namely, the mining node, will be transmitted from the receiving validator node to all the destination participating nodes in the blockchain network in the same fashion as a public information transaction record would; that is, inside a block in the blockchain.

The validated transaction is encrypted by the receiving validator node so that the participating nodes of the transaction are the only ones able to read and execute it.

Therefore, the blockchain will consist of blocks that will contain indiscriminately public and/or restricted, namely private, information transaction records.

It is important to note that the solution only uses a single chain in which at least two types of information transaction records coexist; these are public information transaction records and/or restricted information transaction records (private and anonymous).

A validator node is configured to encrypt the proposed information transaction records from the proposing participating nodes such that the validator node provides restricted information transaction records at the end of the encryption stage.

The encrypted information transaction records can only be decrypted and executed by participating nodes in the blockchain network that hold an encryption privacy key corresponding to the privacy group within which the proposed restricted transaction is performed.

A privacy group is a subset of nodes in the blockchain network that share at least one encryption privacy key to read the restricted transactions transmitted between nodes in the privacy group.

A member of the blockchain network can be part of at least one privacy group and at most can belong to as many privacy groups as different member combinations comprise the blockchain network.

A participating node or blockchain node in the blockchain network refers to a physical or legal person who maintains, shares, and operates with his own local copy of the blockchain, namely, a record book or ledger.

In addition, a member refers to a physical or legal person who performs information transactions and is authorised to access certain information transaction records in the blockchain.

The participating nodes will contain a plurality of encryption privacy keys intended to record restricted information transactions within the privacy groups in which they are included.

The validator node encrypts a proposed information transaction record from the proposing participant node with the encryption privacy key of a particular privacy group and also marks the encrypted transaction record data block as restricted, following which the created block, comprising an encrypted information transaction record, is assembled into the blockchain for later distribution from the validator nodes to the other nodes that are members of the blockchain network.

Therefore, any member of the privacy group connected to the blockchain network can access the details of certain information transactions included in the newly created block.

The participating recipient node decrypts the restricted information transaction records of the created block by using the corresponding encryption privacy key from within its set of encryption privacy keys assigned to each privacy group.

Therefore, the system provides records of restricted or private and public transactions contained in a block that are eventually assembled in the blockchain and distributed uniformly to all network members, providing not only privacy to transactions by encryption, but anonymity because the blocks are distributed only by the validator nodes.

All the network members in the blockchain use a single chain or ledger and, therefore, eliminate redundant resources to manage individual systems.

Privacy is achieved through encryption because members of the blockchain network can only access the details of the information transactions to which they are entitled; that is, they are members of a portion of nodes or privacy group in the blockchain network.

The use of information summary algorithms also establishes the immutability of the transaction records, thus protecting against possible malicious acts. Reliance of data is improved as the encrypted transaction records are stored locally by members.

BRIEF DESCRIPTION OF THE FIGURES

A more detailed explanation is given in the following description and is based on the attached figure.

DESCRIPTION

Figure 1:
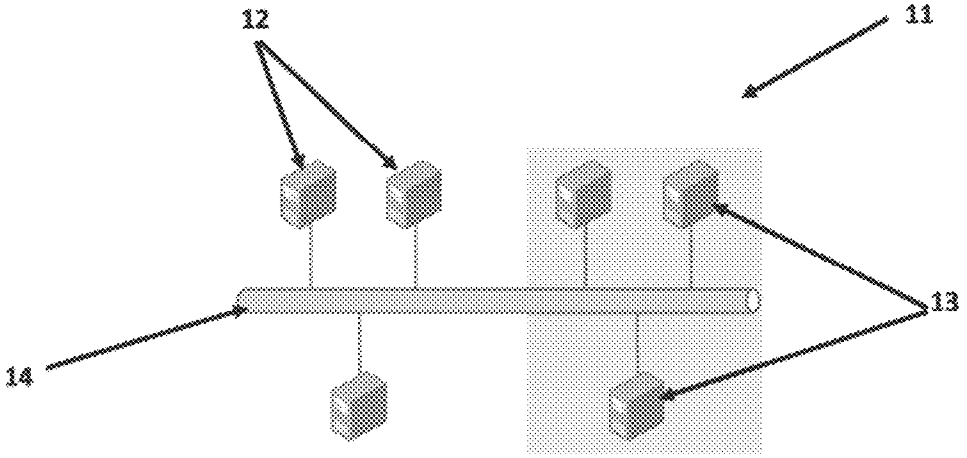
FIG. 1 shows a blockchain network in a block diagram comprising a plurality of nodes that are connected through a telecommunications network to simultaneously broadcast or propagate public and private information transaction records from a blockchain.

In relation to FIG. 1 wherein an environment of a blockchain network, 11, is displayed, wherein a plurality of nodes, participants, 12, and validators or miners, 13, are connected through a telecommunications network, 14, to share and execute transactions distributed within data blocks that are added to a chain of blocks or a blockchain.

The blockchain is distributed over the telecommunications network, 14, from one validator node, 13, to the rest of nodes, 12, 13, of the blockchain network, 11.

The telecommunications network, 14, can be a LAN (local area network), wired or wireless, wide area network, WAN, such as an intranet, an extranet, or the Internet, or the like. The telecommunications network, 14, facilitates communications between the nodes, 12, 13, of the blockchain network, 11.

Nodes 12 and 13 in the blockchain network, 11, are electronic devices similar to a computer running an operating system.

Nodes 12 and 13 that make up the blockchain network, 11, are configured to execute instructions stored on computer-readable storage media. In addition, all the nodes, 12, 13, run communication protocols to interact with the services and/or content provided by the blockchain network, 11.

All the nodes, 12, 13, in the blockchain network, 11, have read access to the chain data in their own local copy. Only validator or mining nodes, 13, can issue or create new blocks with public and restricted transaction records.

One public transaction and/or a restricted transaction, namely, will be transmitted from a participating node 12 to ether validator nodes for its validation and consensus. Once the transaction is validated and agreed, the validator node generates a block of data to add to the blockchain. Each data block includes a hash relative to the immediately preceding data block to prevent modification of the previous information.

However, if a participating node, 12, proposes a private or restricted transaction, the proposed transaction has to be validated by the majority of the validator or mining nodes, 13. This transaction is transmitted to the validator or mining nodes, 13, through a telecommunications network, 14.

The receiving validator node, 13, of the restricted transaction execution request determines the participating nodes, 12, according to the members entered m a certain preconfigured privacy group. The request message for executing the restricted transaction also comprises, in addition to the data specific to the proposed transaction, the metadata relating to the privacy context for which the restricted transaction is executed.

The proposed restricted transaction is transmissible from the receiving validator node, 13, to at least one or more validator nodes, 13, for its validation and consensus. Each validator node, 13, determines whether a transaction is valid and consistent with the other validation nodes, 13, and if it should be integrated into the next block in the chain.

Therefore, the network, 11, of participating nodes, 12, and validators, 13, maintains and manages the chain of data blocks composed simultaneously by public and/or restricted transactions; such that each node, 12, 13, has access to all the data blocks, whether public or restricted information transaction records, even though only the participating nodes, 12, in the particular privacy group have simultaneous access to the restricted transaction and public transactions.

A transaction proposed by a participating node, 12, in the blockchain network has a unique identifier that corresponds to the execution of a summary mathematical function such as MD5, a secure hash algorithm, SHA, BLAKE, or other similar hash functions over its binary content. This unique identifier will be called the transaction hash.

For the initiation of a restricted information transaction, the proponent participant node, 12, privately sends to all the validator nodes, 13, the contents of the information transaction record $t_x$', together with the privacy group identifier.

The validator nodes, 13, execute the information transaction and, once the information transaction has been validated and agreed by a majority of validator nodes, 13, the information transaction record $t_x$' is encrypted by an encryption module of the validator node, 13.

The encrypted information transaction $t_x$ is covered by a new information transaction $t_x$'; so that the information transaction $t_x$' is forced to maintain the same hash identifier as the information transaction $t_x$. In this manner, the encrypted data block is marked as a restricted information transaction $t_x$ for which only the participating nodes, 12, that have the encrypted privacy key are able to read and execute the restricted information transaction $t_x$. The above process is carried out by the validator node, 13, encryption module.

The encrypted and marled data block of the blockchain will be distributed by the validator nodes, 13, of the blockchain network and will comprise 0 to N transactions and at least one information transaction $t_x$'; that is, a block of data that is encrypted and marked as restricted. The participating nodes, 12, in the $t_x$ privacy group are further informed that $t_x$' is a transaction destined for that privacy group.

The validator nodes, 13, are enabled upon receipt of the constraint metadata from the participant node, 12, to execute, validate, package, and deliver ail the restricted transactions to the participating nodes, 12, belonging to the privacy group.

The participating nodes, 12, that wish to perform a restricted information transaction within the privacy group, are configured to decrypt encrypted blocks distributed from the validator nodes, 13, using the corresponding encryption privacy key corresponding to the transaction privacy group.

The validator nodes, 13, are configured to perform privacy group management tasks such as distributing a set of encryption privacy keys. A privacy key from the set of encryption privacy keys is used by validator nodes, 13, to encrypt proposed information transactions that have to be encrypted and marked as restricted data blocks before being assembled within a block and, later, distributed to all the nodes, 12, in the blockchain network; that is, to nodes, 12, in the privacy group and to all the other nodes in the blockchain network, 11.

So that a participating node, 12, in the blockchain network can perform a restricted information transaction with at least one specific participating node, 12, in the blockchain network, 11, both participating nodes, 12, in the blockchain network, 11, must belong to the same privacy group.

All nodes, 12, in the blockchain network, 11, receive each of the data blocks in the existing blockchain, and then, successively, in a continuous way, the blockchain advances.

Therefore, all nodes, 12, 13, in the blockchain network have the same binary copy of the blockchain stored; namely, distributed record book, ledger, immutable, which includes both the public and private transactions. The participating nodes, 12, and validators 13, of the blockchain network, 11, comprise at least one input-output interface for communication between the different nodes, 12, 13, of the blockchain network, 11, at least one encryption-decryption module, a privacy group store that comprises at least one participating node, 12, and at least one set of encrypted privacy keys and a blockchain store; namely, distributed record book, ledger.

The privacy group store on the participating nodes, 12, will store only the privacy groups in which the participating, node, 12, is a member. In contrast, the privacy croup store on the validator nodes, 13, will be the result of the superset of the privacy groups of each node, or the privacy groups that can be formed with the n−1 participating nodes, 12, in the blockchain network, 11.

DETAILED DESCRIPTION

Figure 2:
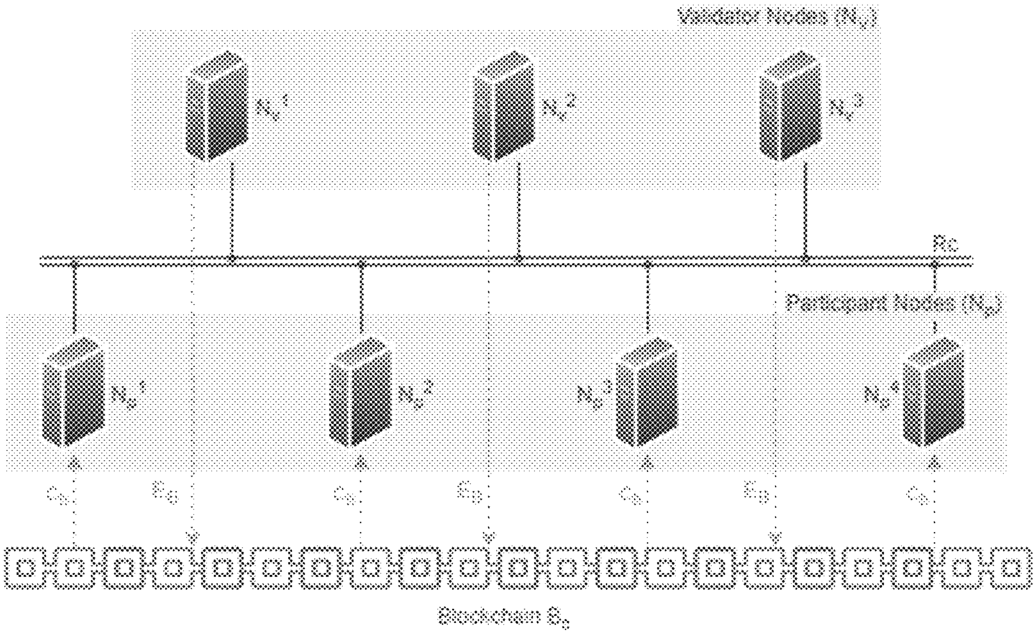
FIG. 2 shows a diagram of a blockchain network comprising a plurality of nodes that are connected through a telecommunications network to simultaneously broadcast or propagate public and private information transaction records from a blockchain.

FIG. 2 shows schematically an environment of a blockchain network wherein a plurality of $N_p$ participating nodes and $N_v$ validator or mining nodes, are connected through a telecommunications network $R_c$ to share and execute distributed transactions within data blocks that are added to a single chain of blocks or Blockchain $B_c$.

The blockchain is distributed over the $R_c$ telecommunications network from an $N_v$ validator node to the rest of the $N_p$ participating nodes in the network. The $R_c$ telecommunications network can be a LAN, wired or wireless, wide area network, WAN, such as an intranet, an extranet, the internet, or the like. The $R_c$ telecommunications network facilitates communications between the nodes $N_v$ and $N_p$.

The $N_v$ and $N_p$ nodes of the Blockchain network are electronic devices such as a computer running an operating system and are configured to execute instructions stored on computer-readable storage media. In addition, all $R_v$ and $R_p$ nodes execute communication protocols to interact with the services and/or content provided by the blockchain network.

A $N_p$ participating node and an $N_v$ validator node in the blockchain network refers to a physical or legal person who maintains, shares, and operates with its own local copy of the blockchain. namely, a record book or ledger.

In addition, a member refers to a physical or legal person who performs information transactions and is authorized to access certain information transaction records in the blockchain.

All $R_p$ nodes in the blockchain network have read access $C_B$ to the chain data in their own local copy. Only the $R_v$ validator or mining nodes can issue or create new $E_B$ blocks with public and restricted transaction records in the $B_c$ blockchain.

A transaction proposed by an $R_p$ or $R_v$ node in the blockchain network has a unique identifier that corresponds to the execution of a summary mathematical function such as MD5, a secure hash algorithm, SHA, BLAKE or other similar hash functions on its binary content. This unique identifier will be called the transaction hash.

All members of the blockchain network use a single chain or ledger to potentially distribute and agree on all the information it operates, therefore, no external systems are required to store, either partially or completely, private or restricted information.

Privacy is achieved through encryption because the members of the blockchain network can only access the details of the information transactions targeted to the privacy groups to which they belong; that is, they are members of at least one or more privacy groups defined in the blockchain network operation.

The use of summary information algorithms also establishes the immutability of transaction records, thus protecting against possible malicious acts. Data resilience is improved as the encrypted transaction records are stored locally by members.

Figure 3:
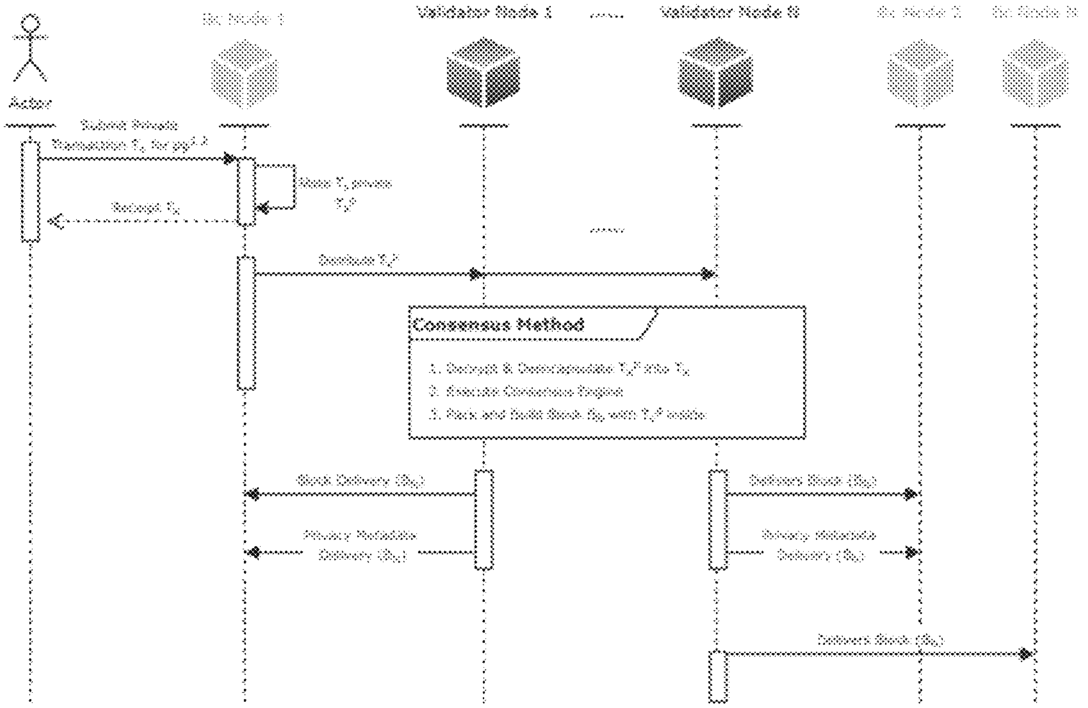
FIG. 3 shows the complete flow from the generation of the restricted transaction to the privacy group, and its inclusion in a block using the consensus mechanism, and the distribution of the block to the other actors, FIG. 4 displays the process that a sending node performs to convert a regular transaction $T_x$ into a restricted transaction $T_x^P$ for a privacy group $pg^y$.

FIG. 3 shows the issuing and distribution flow of a restricted transaction from the issuing node to the block distribution of the blockchain containing it $B_c$.

The transaction is initiated by the sending node that wishes to send the $T_x$ transaction to the privacy group that consists of node 1 and 2. This transaction be transformed into a $T_x^P$ transaction as detailed later. This $T_x^P$ transaction will be distributed to the set of validator nodes [1 . . . N] that will decrypt the $T_x^P$ transaction in $T_x$ using the decryption key belonging to the privacy group $pg^{1,2}$. The $T_x$ transaction is executed and agreed by the set of validator nodes using the selected consensus method. Once this transaction is selected to be included in the block, a block will be created with that transaction, but $T_x^P$ will be included in its private form. It is important to note that this included $T_x^P$ transaction contains all the contents of the original $T_x$ transaction transformed in its private form and not a summary of its contents.

Finally, block $B_N$ is distributed to all the network participants as well as some special metadata for each participant that includes the relationship between each private transaction and the privacy group for which it is intended.

Therefore, the blockchain consist of blocks that will contain indiscriminately public and/or restricted, namely private, information transaction records.

It is important to note that the solution only uses a unique blockchain in which at least two types of information transaction records coexist; these are public information transaction records and/or restricted information transaction records (private and anonymous). Therefore, the blockchain is self-contained for both public and private transactions.

The encrypted information transaction records can only be decrypted and executed by participating nodes in the blockchain network that hold an encryption privacy key corresponding to the privacy group within which the proposed restricted transaction is performed.

A privacy group is a subset of nodes in the blockchain network that share at least one encryption privacy key to read the restricted transactions transmitted between nodes in the privacy group.

A member of the blockchain network can be part of at least one privacy group and at most can belong to as many privacy groups as different member combinations comprise the blockchain network.

The participating nodes will contain a plurality of encryption privacy keys intended to record restricted information transactions within the privacy groups in which they are included.

Therefore, any member of the privacy group connected to the blockchain network can access ail the restricted transaction information content contained in the newly created block that is targeted to the privacy groups of which they are a part.

Figure 4:
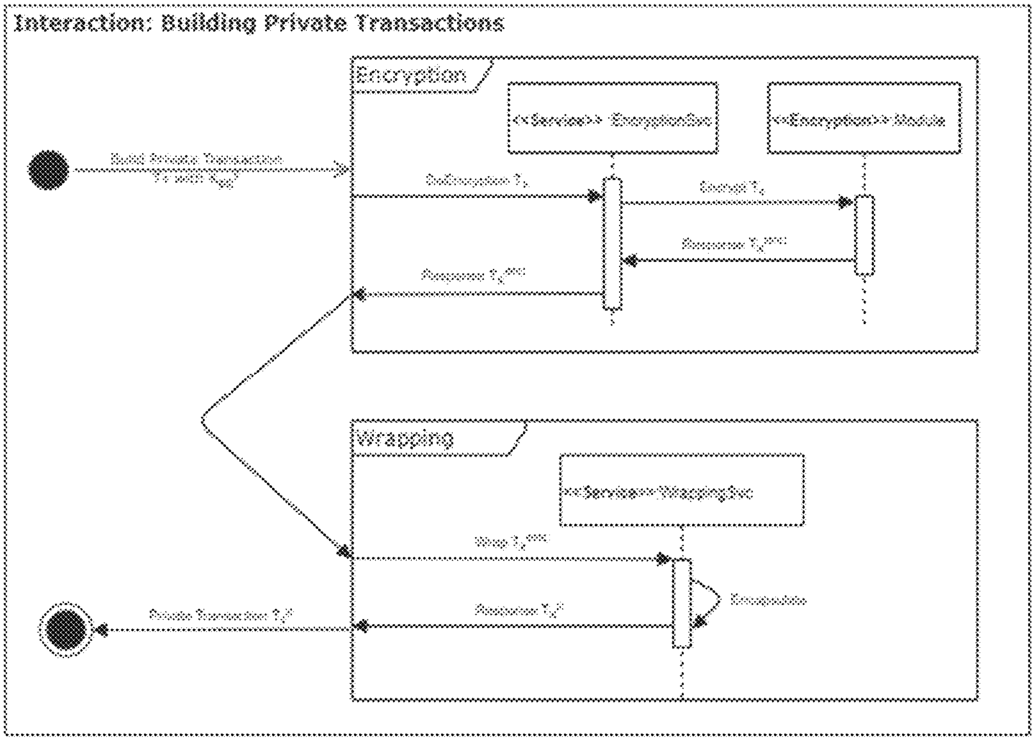

FIG. 4 shows the process of transforming a $T_x$ transaction into its private $T_x^P$ form initially shown in the first phase of FIG. 2. To do this, each Blockchain node will have a component that will execute two distinct phases: encryption and encapsulation. In the first phase, the original $T_x$ transaction will be encrypted with the $K_{pg}^y$ encryption key belonging to the $pg^y$ privacy group for which the transaction is intended.

The result of the encryption phase will be the contents returned from the encryption module of all the $T_x$ content with the $K_{gp}^y$ key, represented by $T_x^{enc}$. This content will be moved to the encapsulation (wrapping) phase in which a transaction is generated whose payload will be the entire contents of $T_x^{enc}$, ultimately resulting in the restricted transaction $T_x^P$.

This $T_x^P$ transaction will be distributed to the validator nodes for consensus as detail FIG. 2.

Figure 5:
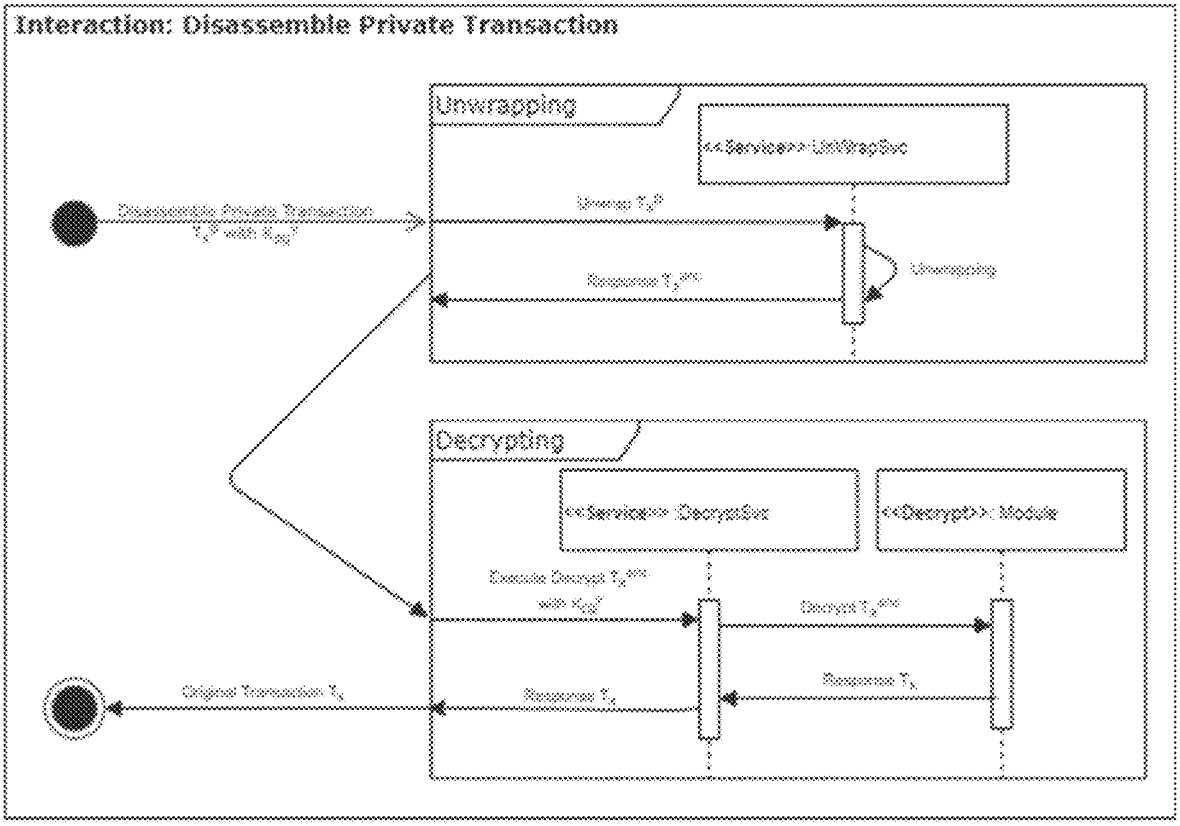
FIG. 5 shows the deconstruction process of a restricted transaction in the original transaction.

FIG. 5 shows the reverse process that will be executed by any node belonging to the $gp^y$ privacy group and/or validator nodes.

The participating node will receive the $T_x^P$ transaction and retrieve from the privacy groups that are part of the $K_{pg}^y$ key associated with the $gp^y$ privacy group. The unwrapping phase wilt be executed first, which will return $T_x^{enc}$, which will then be sent to the decryption module together with $K_{pg}^y$ to decrypt the $T_x^{enc}$ transaction finally obtain $T_x$.

A node that is not a member of the $gp_y$ privacy group will not have the $K_{pg}^y$ decryption key and, therefore, will not be able to obtain the original content of the $T_x$ transaction and, consequently, will not be able to process it.

The invention claimed is:

1. A blockchain system configured to distribute simultaneously at least one public transaction and at least one restricted transaction, wherein the blockchain system includes:

a telecommunications network;

a plurality of proposing participant computer nodes;

a plurality of destination participant computer nodes; and a plurality of receiving validator computer nodes;

said plurality of proposing participant computer nodes, said plurality of destination participant computer nodes and said plurality of receiving validator computer nodes being connected by said telecommunications network, wherein a proposing participant computer node Np selected from said plurality of proposing participant computer nodes is configured to send a tx information transaction record's contents to all the receiving validator computer nodes forming the plurality of receiving validator computer nodes together with an identifier of a particular preconfigured privacy group;

the tx information transaction record is encrypted by the proposing participant computer node Np selected from said plurality proposing participant computer nodes to form an encrypted data block;

the plurality of receiving validator computer nodes are configured to add to a blockchain the tx information transaction record encrypted by means of a new tx' encryption information transaction to form an encrypted and marked data block to provide a new tx' information transaction which is forced to maintain a hash identifier which is the same as the tx information transaction record;

the plurality of receiving validator computer nodes are configured to mark the encrypted data block with at least one restricted tx information transaction, such that only the plurality of destination participating computer nodes that have an encrypted privacy key are configured to read and execute the restricted tx information transaction;

the plurality of receiving validator computer nodes are configured to assemble the encrypted and marked data block to the blockchain to distribute the encrypted and marked data block to the plurality of destination participating computer nodes in the particular preconfigured privacy group of the restricted tx information transaction, the encrypted privacy key is shared by the particular preconfigured privacy group;

the plurality of receiving validator computer nodes are configured to distribute to the plurality of destination participating computer nodes in the particular preconfigured privacy group of the restricted tx information transaction that the restricted tx information transaction is intended for the particular preconfigured privacy group; and the plurality of receiving validator computer nodes are configured to distribute to the plurality of destination participating computer nodes the blockchain comprising the data block with encrypted and marked records wherein the blockchain comprising the encrypted and marked data block with encrypted and marked records, consists of up to N transactions and said restricted tx information transaction.

2. The blockchain system according to claim 1, wherein receiving validator nodes selected from said plurality of receiving validator computer nodes are configured to receive a request message for a restricted transaction execution from the proposing participant computer node Np, wherein at least one receiving validator computer node determines the destination participating computer nodes based on members entered in the particular preconfigured privacy group.

3. The blockchain system according to claim 2, wherein the request message for a restricted transaction execution received by said receiving validator computer nodes, in addition to transaction data proposed by the proposing participant computer node Np selected from said plurality of proposing participant computer nodes, comprises metadata regarding a privacy context for which the restricted transaction is executed.

4. The blockchain system according to claim 1, wherein the blockchain to which a receiving validator computer node selected from said plurality of receiving validator computer nodes adds the new tx' information transaction contains blocks containing public information.

* * * * *